Figure 1:
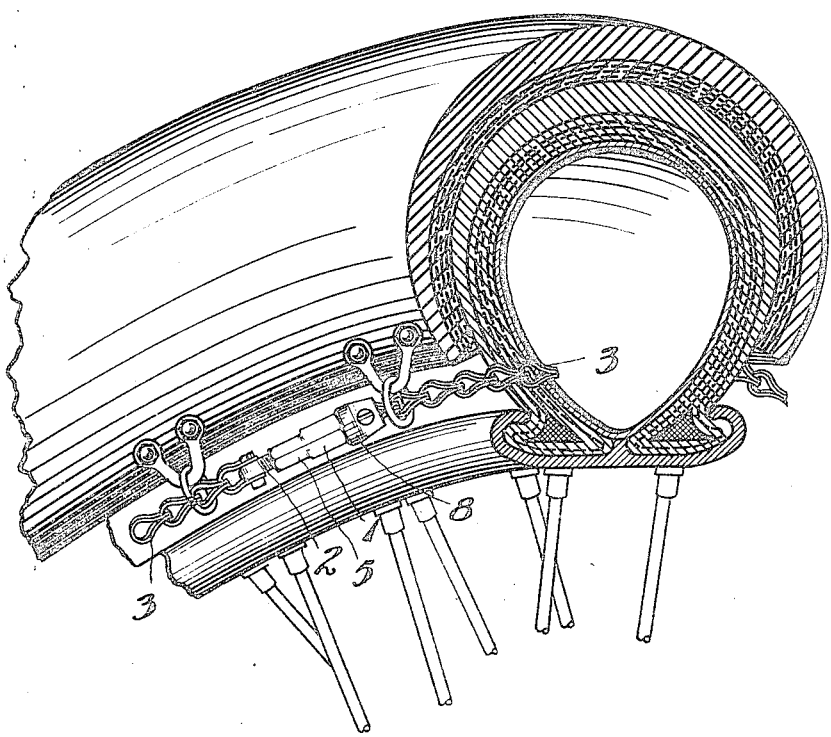

W. H. WILLIAMS.
COUPLING DEVICE FOR TIRE SIDE CHAINS.
APPLICATION FILED OCT. 10, 1914.

1,223,546.

Patented Apr. 24, 1917.
2 SHEETS—SHEET 1.

W. H. WILLIAMS.
COUPLING DEVICE FOR TIRE SIDE CHAINS.
APPLICATION FILED OCT. 10, 1914.
1,223,546.
Patented Apr. 24, 1917.
2 SHEETS—SHEET 2.
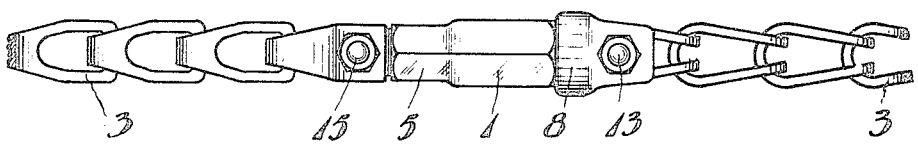
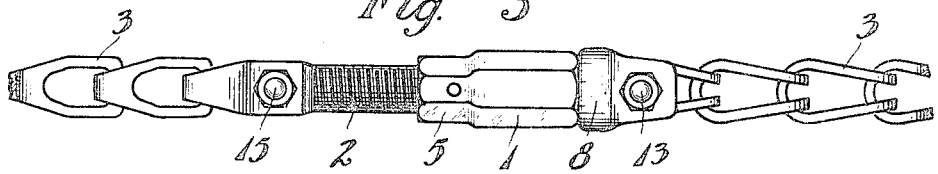
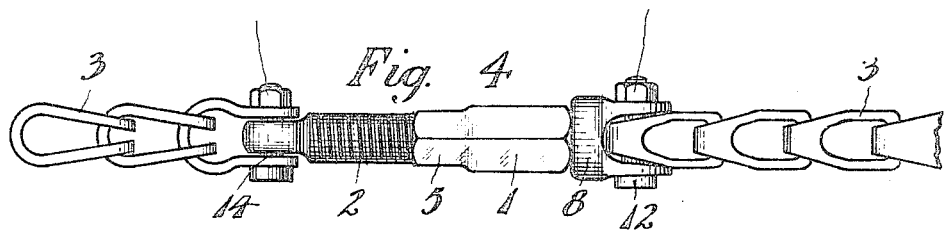
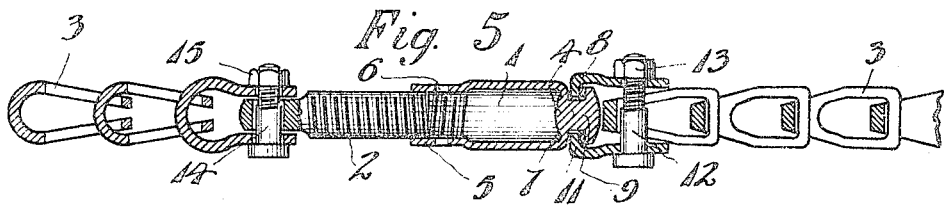

UNITED STATES PATENT OFFICE.

WILLIAM HENRY WILLIAMS, OF ERDINGTON, BIRMINGHAM, ENGLAND, ASSIGNOR OF ONE-HALF TO OSCAR FARKASCH, OF NEWCASTLE-UPON-TYNE, ENGLAND.

COUPLING DEVICE FOR TIRE SIDE CHAINS.

1,223,546.   Specification of Letters Patent.   Patented Apr. 24, 1917.

Application filed October 10, 1914. Serial No. 866,115.

*To all whom it may concern:*

Be it known that I, WILLIAM HENRY WILLIAMS, a subject of the King of Great Britain, residing at Bromford Lane, Erdington, Birmingham, England, managing director, have invented a new and useful Coupling Device for Tire Side Chains; and I do hereby declare the following to be a full, clear, and exact description of the same.

This invention comprises improvements in coupling devices for tire side chains for attaching automobile tire covers which are so worn as to be incapable of being used separately to the tires already in use on the vehicle.

In order that the invention may be readily understood and carried into practice, reference may be had to the accompanying drawings illustrating a convenient embodiment of the invention.

In the drawings:

Figure 1 is a perspective view of a portion of an automobile wheel with my invention applied thereto. Fig. 2 is a side view showing the coupling device in the screwed in or fully contracted condition. Fig. 3 is a similar view showing the device in the fully expanded condition. Fig. 4 is a view in a direction at right angles to that of Fig. 3. Fig. 5 is a longitudinal section on line V—V of Fig. 4.

In the construction illustrated the socket member 1 is produced from a tube portion or pressed up cup open at one end to receive the screw 2 on one end of the chain 3 but closed or "blind" as at 4 at the other end. The diameter of the socket 1 toward the open end is reduced a suitable amount by any suitable means, preferably in closing press tools, and this reduced portion 5 is internally threaded to receive the screw 2 and is preferably provided with a hole or perforation 6 transversely therethrough whereby the threads of the screw 2 are visible and past which the screw 2 should not be withdrawn, instructions to that effect being if desired stamped or otherwise formed on the outside of the socket. The other or "blind" end 4 of the socket is provided with a central cylindrical projecting portion 7 which is passed through a correspondingly sized perforation in a swivel member 8 after which it is riveted over at 9, so as to prevent withdrawal, a thin washer being interposed between the head thus formed and the surface of the inturned portion 11 of the swivel 8. This latter is attached by means of a pin 12 and nut 13 to the corresponding end link of the chain 3. To enable rotation of the socket 1 the same is made hexagonal in shape on its outer surface as clearly shown in Figs. 2–4 so as to be operable by a spanner. The screw 2 is attached to the other end link of the chain in a similar manner by a pin 14 and nut 15.

What I claim then is:

1. As a tension adjusting device for the retaining members of auxiliary covers for pneumatic tires, an adjustable coupling comprising a screw threaded plunger, an interiorly threaded tubular socket portion, into which said plunger is adapted to be screwed, said socket portion being open at one end and blind at the other, the blind end of the socket portion having an integral projection for forming a swivel connection, and the said socket portion being also reduced in diameter toward the open end and being formed externally in the shape of a nut.

2. As a tension adjusting device for the retaining members of auxiliary covers for pneumatic tires, an adjustable coupling comprising a screw threaded plunger, an interiorly threaded tubular socket portion, into which said plunger is adapted to be screwed, said socket portion being open at one end and blind at the other, the blind end of the socket portion having an integral projection for forming a swivel connection, and the said socket portion being also reduced in diameter toward the open end and being formed externally in the shape of a nut, and provided with a small hole transversely therethrough near its open end for the purpose set forth.

3. As a tension adjusting device for the retaining members of auxiliary covers for pneumatic tires, an adjustable coupling comprising a screw threaded plunger, an interiorly threaded tubular socket portion into which said plunger is adapted to be screwed, said socket portion being open at one end and blind at the other, the blind end of the socket portion having an integral projection for forming a swivel connection, and the said socket portion being also reduced in diameter both externally and internally toward the open end and being formed externally in the shape of a nut along its entire length.

4. As a tension adjusting device for the retaining members of auxiliary covers for pneumatic tires, an adjustable coupling comprising a screw threaded plunger, an interiorly threaded tubular socket portion into which said plunger is adapted to be screwed, said socket portion being open at one end and blind at the other, the blind end of the socket portion having an integral projection for forming a swivel connection, a pressed metal ringlike swivel member through which said projection extends, said projection being riveted over to prevent the withdrawal of said member, a washer between said member and said projection, said pressed member having arms thereon, and said socket portion being also reduced in diameter toward the open end and being formed externally in the shape of a nut.

In testimony whereof, I have signed my name to this specification in the presence of two subscribing witnesses.

WILLIAM HENRY WILLIAMS.

Witnesses:
F. GILBERT BRETTELL,
E. DAWSON HARDCASTLE.